United States Patent
Truitt et al.

(10) Patent No.: US 10,467,318 B2
(45) Date of Patent: Nov. 5, 2019

(54) DYNAMIC INFORMATION RETRIEVAL AND PUBLISHING

(71) Applicant: Futurewei Technologies, Inc., Plano, TX (US)

(72) Inventors: Rhonda Truitt, McKinney, TX (US); Farhad Patel, Plano, TX (US); Zhenzi Li, Shenzhen (CN); Qi Wen, Shenzhen (CN); Sally Martir, Garland, TX (US)

(73) Assignee: Futurewei Technologies, Inc., Plano, TX (US)

(*) Notice: Subject to any disclaimer, the term of this patent is extended or adjusted under 35 U.S.C. 154(b) by 749 days.

(21) Appl. No.: 15/053,702

(22) Filed: Feb. 25, 2016

(65) Prior Publication Data

US 2017/0249323 A1    Aug. 31, 2017

(51) Int. Cl.
| G06F 17/30 | (2006.01) |
| G06F 16/958 | (2019.01) |
| G06F 16/13 | (2019.01) |
| G06F 16/93 | (2019.01) |
| G06F 16/17 | (2019.01) |
| G06F 16/954 | (2019.01) |

(52) U.S. Cl.
CPC ............ *G06F 16/958* (2019.01); *G06F 16/13* (2019.01); *G06F 16/1727* (2019.01); *G06F 16/93* (2019.01); *G06F 16/954* (2019.01)

(58) Field of Classification Search
CPC .................................................. G06F 17/3089
See application file for complete search history.

(56) References Cited

U.S. PATENT DOCUMENTS

| 5,603,025 A * | 2/1997 | Tabb .................. G06F 16/94 |
| 6,581,068 B1 * | 6/2003 | Bensoussan ...... G06F 16/24539 |
| 7,949,654 B2 * | 5/2011 | Das .................. G06F 16/2471 707/718 |
| 8,571,946 B2 | 10/2013 | Greaves et al. |
| 9,372,856 B2 * | 6/2016 | MacDonald .......... G06F 16/283 |
| 2001/0037379 A1 * | 11/2001 | Livnat .................. G06F 21/6218 709/219 |
| 2003/0033287 A1 * | 2/2003 | Shanahan .......... G06F 17/30011 |
| 2004/0162900 A1 * | 8/2004 | Bucher ............... H04L 67/2842 709/225 |
| 2004/0168115 A1 * | 8/2004 | Bauernschmidt ... G06F 17/2241 715/238 |
| 2005/0203924 A1 * | 9/2005 | Rosenberg ............ G06F 16/338 |
| 2005/0262039 A1 * | 11/2005 | Kreulen .................. G06F 16/31 |
| 2006/0053077 A1 * | 3/2006 | Mourad .............. G06F 17/3089 705/51 |
| 2007/0050353 A1 * | 3/2007 | Ekberg .................. G06F 16/972 |
| 2007/0101248 A2 | 5/2007 | Schumacher et al. |

(Continued)

*Primary Examiner* — Syed H Hasan
(74) *Attorney, Agent, or Firm* — Conley Rose, P.C.

(57) ABSTRACT

A method comprising receiving a request to create an import file for a document browser from a Personal Document Collection comprising a topic; retrieving a topic content associated with the topic from a content management system (CMS), wherein the topic content comprises a user defined content applied to a master topic content; generating a content page from the topic content, wherein the content page is configured to be displayed within the document browser; generating a navigation structure based on the topic content and the document browser; and compress the content page and the navigation structure into the import file.

20 Claims, 8 Drawing Sheets

(56) References Cited

U.S. PATENT DOCUMENTS

| | | | | |
|---|---|---|---|---|
| 2007/0192300 A1* | 8/2007 | Reuther | ............. | G06F 16/2452 |
| 2007/0209005 A1* | 9/2007 | Shaver | ............... | G06F 17/3089 |
| | | | | 715/733 |
| 2007/0239508 A1* | 10/2007 | Fazal | ................ | G06Q 10/0637 |
| | | | | 705/7.36 |
| 2008/0027828 A1* | 1/2008 | Haberman | ......... | G06Q 30/0277 |
| | | | | 705/14.73 |
| 2011/0119223 A1* | 5/2011 | Lane | ........................ | G06F 8/36 |
| | | | | 706/50 |
| 2011/0161312 A1* | 6/2011 | Wallman | ............. | G06F 17/3089 |
| | | | | 707/722 |
| 2015/0112963 A1* | 4/2015 | Mojtahedi | ........... | G06F 17/3087 |
| | | | | 707/711 |
| 2015/0261773 A1* | 9/2015 | Walid | ................... | G06F 16/951 |
| | | | | 707/769 |
| 2016/0335280 A1* | 11/2016 | Shmerl | ............... | G06F 17/3012 |

\* cited by examiner

DYNAMIC INFORMATION RETRIEVAL AND PUBLISHING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Information retrieval (IR) systems such as web search engines are becoming increasingly prominent as the Internet grows in both amount of information indexed and the number of users. While gains are being made to improve the performance and effectiveness of these systems, the majority of IR systems are static. These IR systems are constructed by chaining together a fixed set of IR techniques such as query formation, query evaluation, precision improvement, recall improvement, clustering, and results visualization. Once an IR system is completed and put into operation, the same sequence of operations is performed on every query processed. The static nature of IR systems reflects the methods used to evaluate new IR techniques. An IR technique is typically tested offline to determine if the technique is reliable enough to be included in an IR system. In these experiments, a test collection including a set of queries and a set of documents is used. Each document is tagged with relevance judgments for each query in the test collection. A document is tagged as relevant if the document satisfies the information needed posed by the query.

SUMMARY

In one embodiment, the disclosure includes a network element (NE) comprising a receiver configured to receive, from a host device, a request to create an import file for a specified document browser from a Personal Document Collection comprising a topic; a processor coupled to the receiver and configured to retrieve a topic content associated with the topic from a content management system (CMS), wherein the topic content comprises a user defined content applied to a master topic content for the topic; generate a content page from the topic content, wherein the content page is configured to be displayed within the specified document browser; generate a navigation structure based on the topic content and the specified document browser; compress the content page and the navigation structure into the import file; and publish the import file; and a transmitter coupled to the processor and configured to transmit a location of the import file to the host device. In some embodiments, the disclosure also includes wherein the processor is further configured to retrieve an attachment associated with the topic from the CMS, wherein the content page is further generated from the attachment, and/or wherein the content page is generated according to a Darwin information Typing Architecture (DITA) specification, and/or wherein publishing the import file comprises generating a Hypertext Transfer Protocol (HTTP) download Uniform Resource Locator (URL) as the location of the import file, and/or wherein the processor is further configured to build indexes based on the topic content; construct a table of contents from the indexes; and compress the table of contents into import file, and/or wherein the specified document browser is HUAWEI Electronic Documentation Explorer (HEDEx), and/or wherein the NE and the CMS are configured to operate within a data center, and/or wherein the Personal Document Collection is associated with a user account and provides a mechanism to customize a pre-existing set of documents by an application of filters and metadata while keeping an original hierarchy of the set of documents, and/or wherein the processor is further configured to retrieve the master topic content as the topic content when no user defined content for the topic associated with the Personal Document Collect is saved to the CMS, and/or wherein the topic is assigned to a document through an inclusion in a DITA map saved to the CMS.

In another embodiment, the disclosure includes a network device comprising a receiver configured to receive a list of topics associated with a Personal Document Collection assigned to a user account; receive a request to create an import file for a document browser based on the Personal Document Collection; a processor coupled to the receiver and configured to store the list of topics to a CMS; retrieve topic content for each topic in the list of topics from the CMS; generate a content page for each topic in the list of topic based on the retrieved topic content, wherein the content page is configured to be displayed within the document browser; generate a navigation structure based on indexes generated from the retrieved topic content and the document browser; and compress the generated content pages and the navigation structure into the import tile; and a local memory coupled to the processor and configured to store the import file. In some embodiments, the disclosure also includes wherein the receiver is further configured to receive user content associated with a topic, and wherein the processor is further configured to store the user content to the CMS; and retrieve the user content as the topic content when the user content is stored in the CMS, and/or wherein the request includes a filter or a keyword, and wherein the processor is further configured to retrieve the topic content for only the topics in the topic list that match the filter or keyword; and generate the content page for only the topics in the topic list that match the filter or keyword, and/or wherein the CMS is configured to operate in a data center and is accessed remotely by the network device through a network, and/or wherein a number of topics from the topic list are assigned to a document via a DITA map, and/or wherein each content page is generated according to a DITA specification.

In yet another embodiment, the disclosure includes a method comprising receiving, via a receiver, a request to create an import file for a document browser from a Personal Document Collection comprising a topic; retrieving, via a processor coupled to the receiver, a topic content associated with the topic from a CMS, wherein the topic content comprises a user defined content applied to a master topic content; generating, via the processor, a content page from the topic content, wherein the content page is configured to be displayed within the document browser; generating, via the processor, a navigation structure based on the topic content and the document browser; and compress, via the processor, the content page and the navigation structure into the import file. In some embodiments, the method further comprises storing, via the processor, the import file to a memory location, and/or retrieving, via the processor, an attachment associated with the topic from the CMS, wherein the content page is further generated from the attachment. In some embodiments, the disclosure also includes wherein the request was received from a host device and wherein the method further comprises generating, via the processor, a HTTP download URL as a location of the import file; and transmitting, via a transmitter coupled to the processor, the location to the host device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
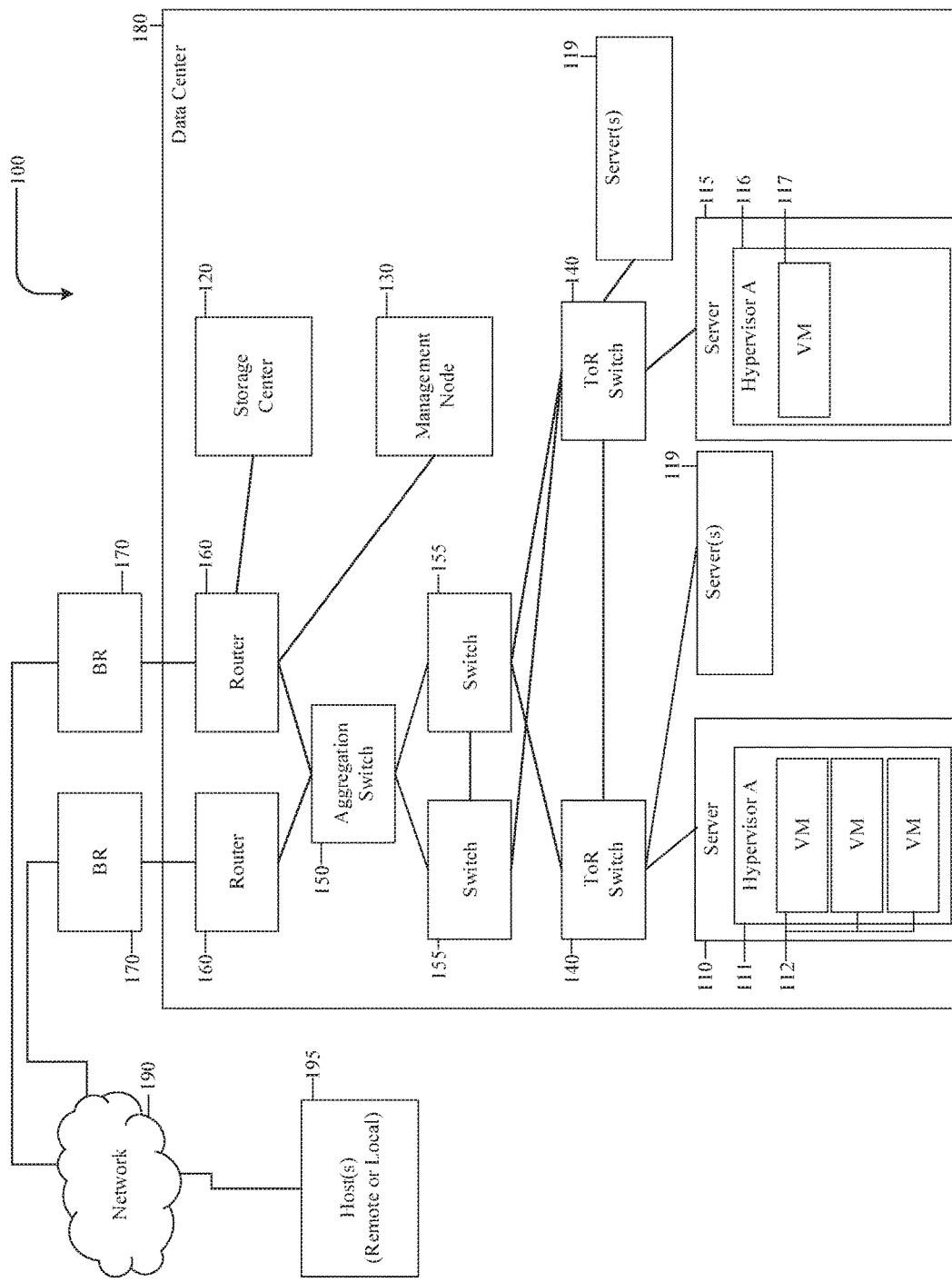
FIG. 1 is a schematic diagram of an embodiment of a data center network comprising a data center, a network, and a host(s) which may be employed to provide a dynamic content publishing (DCP) system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Dynamic IR is a methodology that provides an ability to locate desired content or information (e.g., a document or a segment of a document) without browsing through or downloading large volumes of information to locate the desired content. Dynamic IR may be characterized by rich interactions including query formulations, document clicks, document examination, and traced eye and mouse movement. Dynamic IR explores interaction with and/or actions taken on a monitored system or data, learns from the interaction, and adjusts future actions based on the learnings. Dynamic IR includes a temporal dependency where subsequent iterations are optimized for a determined IR goal, metric, and/or policy. In an embodiment, dynamic IR is made possible through employing a combination of search filters and metadata with defined search algorithms and methodologies (e.g., a search engine). Dynamic IR for documents includes information filtering as well as providing for and monitoring document content change(s).

A system built to employ a dynamic IR methodology (i.e., a dynamic IR system) responds to the dynamics of a context or setting into which the dynamic IR system is deployed in order to achieve a determined IR goal, metric, and/or policy. Such systems are resistant to adverse change or error and are able to learn and adapt. In various embodiments, a dynamic IR system comprises three defining characteristics: environmental feedback, temporal dependency, and an overall goal. Environmental feedback allows a dynamic IR system to perceive an associated context or setting according to various stimulus (e.g., user feedback and/or system interaction(s)). Temporal dependency provides a framework that allows a dynamic IR system to operate within distinct stages (e.g., periods of time). These stages allow the dynamic IR system to adapt to the perceived environmental feedback though a dynamic implementation of behavioral or functional changes over time in response to the perceived environmental feedback. A determined overall goal, metric, and/or policy provide a direction and scale on which to measure overall system performance during each temporal stage. The employment of the determined overall goal, metric, and/or policy, as opposed to an immediate goal, establishes an overall effectiveness of the dynamic IR system. As a result, action(s) chosen by the dynamic IR system at each stage is selected in consideration of all past and future interactions.

A document browser is a software program that requests a document(s) from an electronic resource(s) on behalf of an external entity. A document browser may have the ability to display, archive, or analyze a document once the document has been retrieved from the electronic resource(s) and may also function as a reader program for markup languages. In various embodiments, a document browser makes a request for a document through a document server. To state another way, a document server may handle a request for a document made from a document browser on behalf of an external entity. In this manner, a document server acts as a manager or generator of active and static documents that contain content written, produced, or edited by one or more external entities. A document browser may operate on a host or client computer such as a handheld device, a personal computer (PC) or personal digital assistant (PDA). A document browser may take as input a document which includes control tags. In an embodiment, a document browser interprets the included control tags (e.g., Hypertext Markup Language (HTML) tags) to present the document in a particular manner according to the included control tags. Example of such document browsers include the HEDEx software product from HUAWEI Technologies Co. Ltd., which may be employed to browse, search, add remarks to, print, and manage product documentation. Technology employed in a dynamic IR system may not provide a mechanism to export saved content into an import file for use by a documentation browser.

Disclosed herein is a dynamic IR system, titled DCP system/solution, that exports content saved in a Personal Document Collection into a documentation browser (e.g., HEDEx) via the generation of an import/export file. The DCP system allows for the application of filters and sub-filters (e.g., further divisions of the filters) for various roles or products to be applied to documents within a document repository. In various embodiments, the information within a document contained within the document repository may be indexed according to various topics. These indexes are referred to as information modules or topics. The various filters and sub-filters may be applied to the indexed topics within a document as well as to the entire document. When the various filters are applied to the documents and/or topics, a result set is displayed. The DCP system allows for markup to be applied to the resulting various topics and documents as each is being displayed for reading. The topics and documents along with any corresponding markups to the topics and/or documents may be saved to a Personal Document Collection that is associated with a corresponding user profile. The DCP system allows for the export of the content saved to a Personal Document Collection into a documentation browser via the creation of an import/export file.

FIG. 1 is a schematic diagram of an embodiment of a data center network 100 comprising a data center 180, a network 190, and a host(s) 195, which may be employed to implement a DCP system. The data center 180 may comprise servers 110, 115, and/or 119, which may operate hypervisors 111 and/or 116. The hypervisors 111 and/or 116 may create and/or operate virtual machines (VMs) 112 and/or 117. The data center 180 may also comprise a management node 130, which may be connected to the servers 110, 115, and/or 119 as shown in FIG. 1. The hypervisors 111 and/or 116 may register VMs 112 and/or 117 with the management node 130. The hypervisors 111 and/or 116 may move VMs 112 and/or 117 to other hypervisors and/or servers. The hypervisors 111 and/or 116 may communicate with management node 130 to facilitate the transmission of VMs 112 and/or 117 as well as perform associated host routing of active network traffic to VMs 112 and/or 117.

Data center 180 may be a facility used to house computer systems and associated components, such as telecommunications and storage systems. A data center 180 may include redundant or backup power supplies, redundant data communications connections, environmental controls (e.g., air conditioning, fire suppression) and security devices. Data center 180 may comprise a network 100 to interconnect servers (e.g., servers 110, 115, and/or 119) and storage devices storage center 120), manage communications, and provide host 195 (e.g., remote hosts and/or local hosts) access to data center 180 resources (e.g., via border routers (BRs) 170). Host 195 may be any device configured to request a service (e.g., a process, storage, etc.) from a server (e.g., servers 110, 115, and/or 119.) Host 195 may be a remote host, which may be positioned outside of the data center 180, or a local host, which may be positioned inside the data center 180.

A data center 180 may house a plurality of servers, such as servers 110, 115, and/or 119. A server 110, 115, and/or 119 may be any device configured to respond to requests and/or provide services, such as DCP system servicers, to hosts, such as host 195. A server may provide services via VMs, such as VMs 112 and/or 117. A VM 112 and/or 117 may be a simulation and/or emulation of a physical machine that may be configured to respond to requests in a predetermined manner. For example, VMs 112 may run a single program and/or process and VM 117 may act as a system platform such as an operating system (OS). VM 112 and/or 117 may receive requests from hosts, such as host 195, provide data storage and/or retrieval, execute processes, and/or transmit data (e.g., process results) to the hosts. VMs 112 and/or 117 may be managed by hypervisors 111 and/or 116. A VM may comprise a plurality of virtual interfaces, which may be supported by a hypervisor and may be used to communicate with hosts, such as host 195. Internet protocol (IP) address(es) may be associated with a VM, a VM interface, and/or a plurality of a VM's interfaces.

A hypervisor 111 and/or 116 may he a hardware, software, and/or firmware VM management entity, which may operate on a server 110, 115, and/or 119, and may act as a virtual operating platform to a VM (e.g., VMs 112 and/or 117.) The hypervisor 111 and/or 116 may create, manage, and transfer VMs to other hypervisor(s). Servers 110, 115, and/or 119 may be positioned in racks. Each rack may comprise a top-of-rack (ToR) switch 140, which may be a switch used to connect the servers in a data center 180 to the data center network 100. The ToR switches 140 may be connected to each server in a rack as well as to other ToR switches 140 to allow communication between racks. Racks may be positioned in rows. The ToR switches 140 may be connected to other switches 155, such as end-of-row (EoR) switches, which may allow communication between rows. Switches 155 may be connected to an aggregation switch 150. The aggregation switch 150 may aggregate communications between the servers for interaction with the data center's 180 core network. The aggregation switch 150 may be connected to routers 160, which may be positioned inside the data center 180 core network. Communications may enter and leave the data center 180 via BR 170. A BR may be the positioned at the border of the network 100 and may provide connectivity between VMs and remote hosts communicating with the VMs (e.g., via the Internet).

The data center 180 may comprise a storage center 120. The storage center 120 may comprise a plurality of storage devices configured to store and retrieve data based on commands from the servers 110, 115 and/or 119, VMs 112 and/or 117, hypervisors 111 and/or 116, and/or hosts 195. The storage center 120 may be connected to the data center 180 (e.g., via router 160) using a high speed connection such as an optical fiber channel.

The data center 180 may also comprise a management node 130. The management node 130 may store data related to the VM mobility and may assist and/or manage VM mobility in conjunction with the hypervisors 111 and/or 116. The management node 130 may comprise a binding cache, which may comprise a binding cache entry for each VM in the data center 180 and/or VMs that have been moved outside of the data center moved to another hypervisor in another data center.) The binding cache may comprise the IP address of a VM and/or VMs active interfaces, a media access control (MAC) address of the VM, a VM identifier, and/or a Proxy-care-of-address (COA) for a VM.

Figure 2:
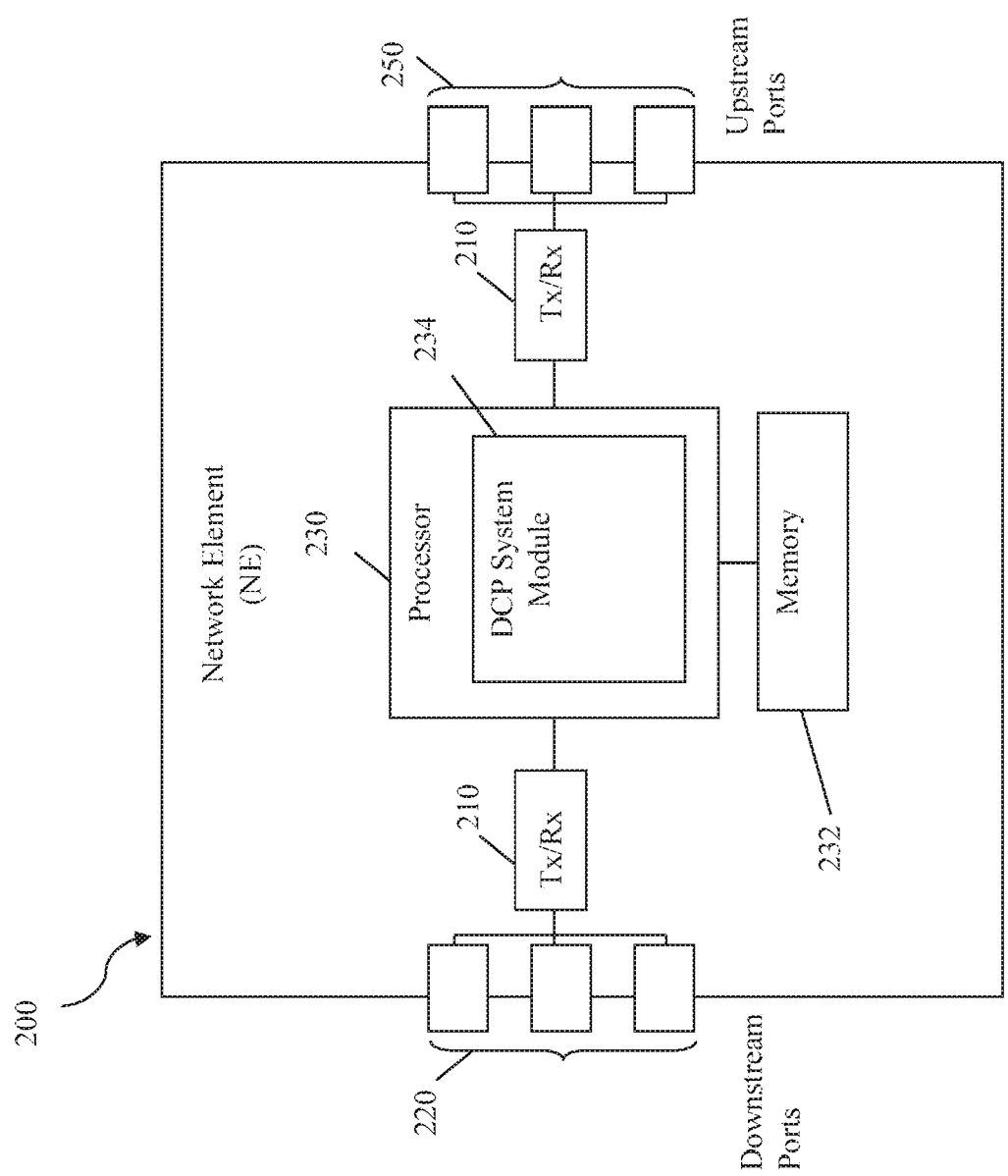
FIG. 2 is a schematic diagram of an embodiment of an NE configured as a server within a data center which may be employed to provide a DCP system.

FIG. 2 is a schematic diagram of an embodiment of an NE 200 configured as a server, such as server 110, 115, and/or 119, within a data center, such as data center 180, which may be employed to provide a DCP system. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports packets through a network, e.g., a switch, router, bridge, server, a client, etc.

As shown in FIG. 2, the NE 200 may comprise transceivers (Tx/Rx) 210, which are transmitters, receivers, or combinations thereof. A Tx/Rx 210 is coupled to a plurality of downstream ports 220 (e.g., downstream interfaces) for transmitting and/or receiving packets from other nodes and a Tx/Rx 210 coupled to a plurality of upstream ports 250 (e.g., upstream interfaces) for transmitting and/or receiving packets from other nodes, respectively. A processor 230 is coupled to the Tx/Rxs 210 to process the packets and/or determine which nodes to send packets to. The processor 230 may comprise one or more multi-core processors and/or may interact with memory 232, which function as data stores, buffers, Random Access Memory (RAM), Read Only Memory (ROM), etc. Processor 230 may implement hypervisor 111, hypervisor 116, VM 112, and/or VM 117. Processor 230 may be implemented as a general processor or may be part of one or more application specific integrated circuits (ASICs) and/or digital signal processors (DSPs). Processor 230 comprises a DCP System Module 234, which implements at least some of the methods discussed herein such as methods 600, 700, 800 and 900 described below. In an alternative embodiment, DCP System Module 234 is implemented as instructions stored in memory 232, which are executed by processor 230, or implemented in part in the processor 230 and in part in the memory 232, for example a computer program product stored in a non-transitory memory that comprises instructions that are implemented by the processor 230. In another alternative embodiment, the DCP System Module 234 is implemented on separate NEs. In yet another alternative embodiment, the DCP System Module 234 is implemented within a VM, such as VM 112 and/or 117, created within a hypervisor, such as hypervisors 111 and/or 116, operated within processor 230. The downstream ports 220 and/or upstream ports 250 may contain electrical and/or optical transmitting and/or receiving components.

It is understood that by programming and/or loading executable instructions onto the NE 200, at least one of the processor 230, DCP System Module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
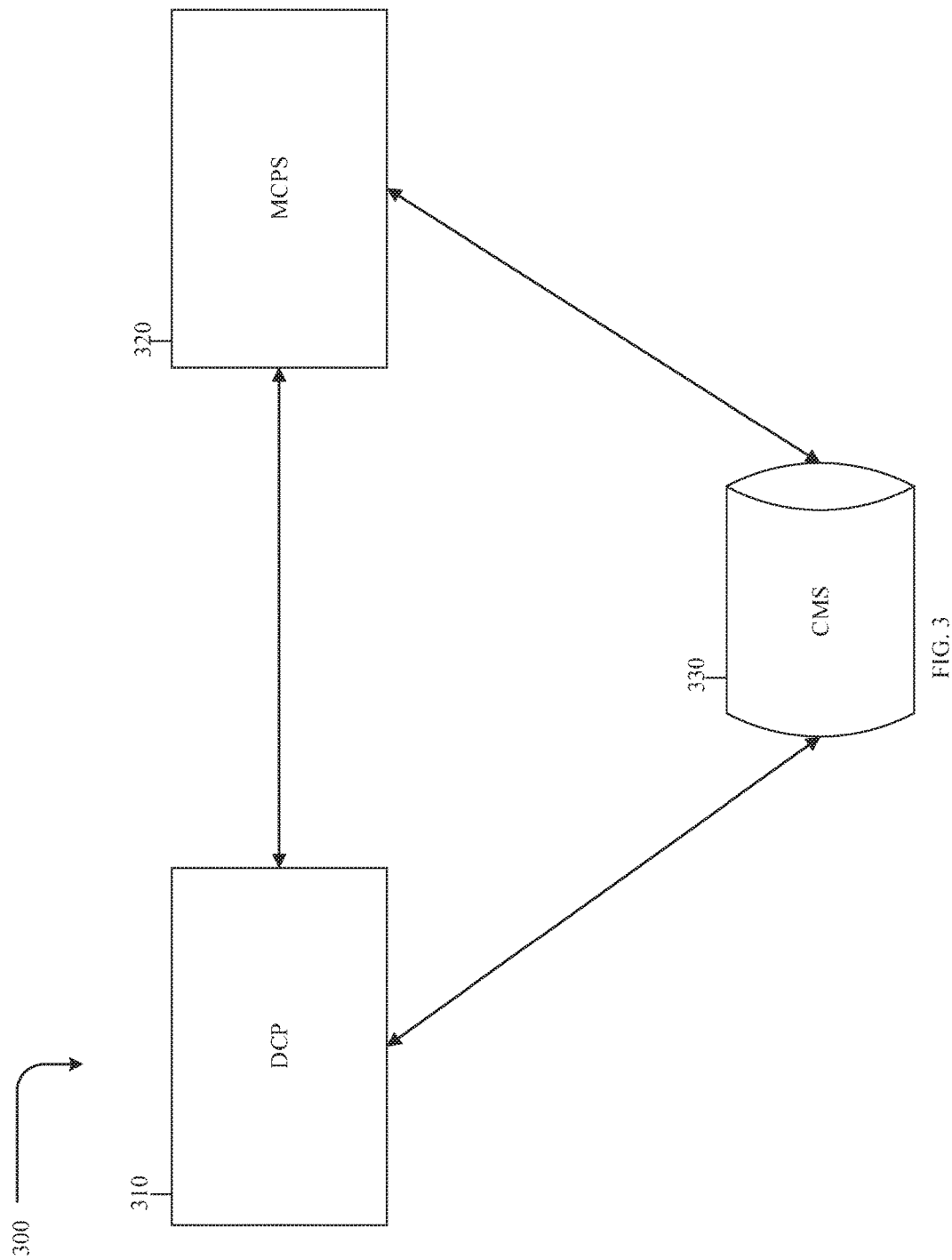
FIG. 3 is a schematic diagram of an embodiment of a DCP system deployed on an NE configured as a server within a data center.

FIG. 3 is a schematic diagram of an embodiment of a DCP system 300, deployed on an NE, such as NE 200, configured as a server, such as servers 110, 115, and 119, within a data center, such as data center 180. DCP system 300 comprises DCP component 310, multi-channel publishing system (MCPS) component 320, and CMS component 330, which may be interconnected as shown in FIG. 3 or is any other suitable arrangement. In an alternative embodiment, DCP system 300 maybe implemented on a host device, such as host 195, in combination with a server(s), such as servers 110, 115, and 119, within a data center, such as data center 180 where the CMS component 300 is implemented on the server(s) connected to a database server or virtual database server within the data center and the DCP component 310 and the MCPS component 320 are implemented on the host device. In yet another alternative embodiment, the DCP component 310, the MCPS component 320, and the CMS component 330 are implemented on the host device where the CMS component 330 may sync data with a database or CMS implemented within a data center, such as data center 180.

In an embodiment, DCP component 310 is an interface for user interaction. DCP component 310 may also select, retrieve, assemble, and customize topics/information modules. A topic is a standalone chunk, section, or chapter of content (e.g., a document). For example, a document may include a topic regarding a procedure to install a router or a topic containing a table listing of default settings for a particular mobile device. Topics may be of different files types (e.g., text, video, and/or images). Topics may be categorized into different categories regarding, for example, contained content. For example, various topics may be categorized as a task or procedural type, a reference type (e.g., a check list or a values table), or theory type (e.g., a topic explaining how a particular device works). MCPS component 320 processes and publishes topic source files to documents in various formats, such as HEDEx, portable document format (PDF), and HTML. In an embodiment, a topic source file is a file that contains the content from a document of an indexed topic. CMS component 330 stores topic source files and a DITA map.

In various embodiments, a DITA map is employed by DCP system 300 to organize topics into a document. The DITA map organizes included topics and provides a structure to build the defined document into a desired output file (e.g., an output web or PDF tile). Navigation files may also be generated by the DCP system 300 based on a DITA map and/or links for a document or organized grouping of topics. A DITA map file may reference one or more DITA topic files by employing an element denoting the topic(s) (e.g., <topicref>). A <topicref> elements may be nested to reflect a hierarchical relationship between the topics. A DITA map may be constructed by DCP system 300 according to a DITA specification. A DITA specification defines both a set of document types for authoring and organizing topic-oriented information and a set of mechanisms for combining, extending, and constraining document types. The relationships defined in a DITA map may be employed by the DCP system 300 to create a Table of Contents (TOC), aggregate the contained topics into a PDF document, and/or create links between topics in output, such as an import file for a document repository. A topic may be assigned to multiple documents through corresponding DITA maps.

In various embodiments, a Personal Document Collection associated with a user profile employed within DCP system 300 provides a mechanism to customize a pre-existing set of documents by an application of filters and metadata while keeping an original hierarchy of the set of documents. The Personal Document Collection may build a Data Object comprising the saved or filtered topics and/or user defined markup for (e.g., metadata) the saved or filtered topics to provide the content for a Personal Document Collection, in an embodiment, documents accessed through DCP system 300 are grouped into product or solution collections. These collections may then be grouped according to functional categories. For examples, categories may include Descriptions, Installation and Commissioning, Operations and Maintenance, Fault Management, and References. DCP system 300 provides a mechanism through which users may customize documents and/or topics saved to a Personal Document Collection discovered within the DCP system through a combination of filters and metadata. DCP system 300 provides a mechanism that removes entire categories or specific topics within categories from the collection to be saved to a Personal Document Collection. Categories may be customized by users of DCP system 300 for a Personal Document Collection thereby streamlining a pre-existing set of documents, in an embodiment, a resulting output of categories and topics in the collection retains an associated hierarchy minus various customizations made by a user for the Personal Document Collection associated with user's profile. In various embodiments, content saved for a Personal Document Collection may be exported into a format supported by a specified documentation browser (e.g., HEDEx).

Figure 4:
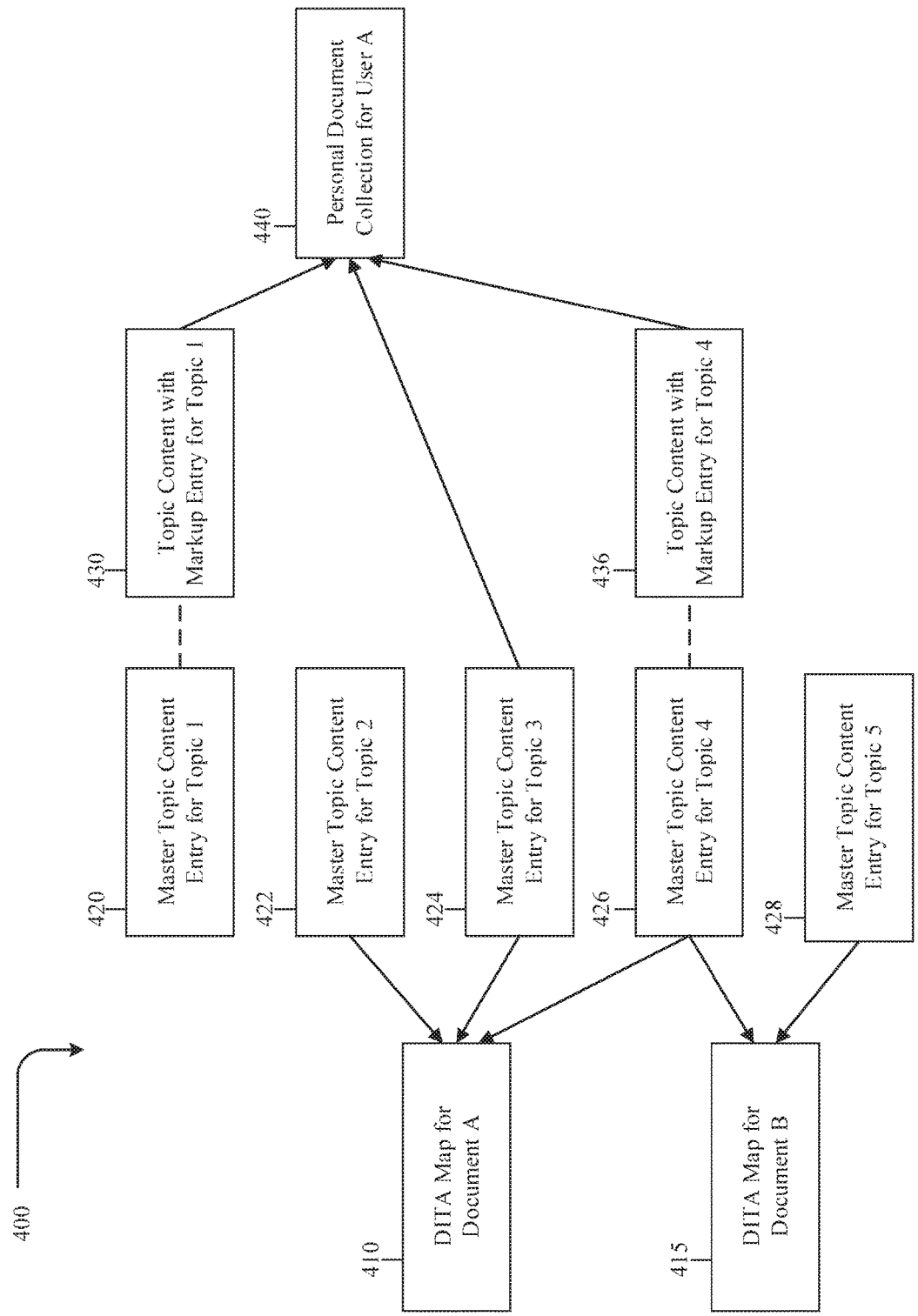
FIG. 4 is an embodiment of data model employed by a DCP system deployed on a host device or on an NE configured as a server within a data center.

FIG. 4 is an embodiment of data model 400 employed by a DCP system, such as DCP system 300, deployed on a host device, such as host 195, or on an NE, such as NE 200, configured as a server, such as servers 110, 115, and 119, within a data center, such as data center 180. Data model 400 comprises DITA maps 410 and 415; master topic content entry for Topic 1 420, Topic 2 422, Topic 3 424, Topic 4 426, and Topic 5 428; topic content with markup entries for Topic 1 430 and Topic 4 436; and. Personal Document Collection entry 440. DITA map 410 comprises a DITA map that creates document A. Based on the contents of the DITA map 410, Document A comprises master topic content entries for Topic 2 422, Topic 3 424, and Topic 4 426. DITA map 415 comprises a DITA map that creates document B. Based on the contents of the DITA map 415, Document B comprises master topic content entries for Topic 4 426 and Topic 5 428. Personal Document Collection 440 comprises a listing of topics that User A has saved to the Personal Document Collection 440 for an account accessed by User A. The Personal Document Collection 440 comprises topics that contain personalized markup, topic content with markup entry for Topic 1 430 and Topic 4 436. The Personal Document Collection entry 440 also comprises topics without personalized markup, master topic content for topic 3 424. While various numbers of entries are shown for each data type (e.g., DITA Map, Topic, Topics with Markup, and Personal Document Collection) are shown in FIG. 4, it is understood that a data model employed by a DCP system 400 may comprise any number of containers for each type. By employing data model 400, various topics may be crossed referenced between person document collections saved for various users of a DCP system, such as DCP system 300, and system defined DITA maps.

Figure 5:
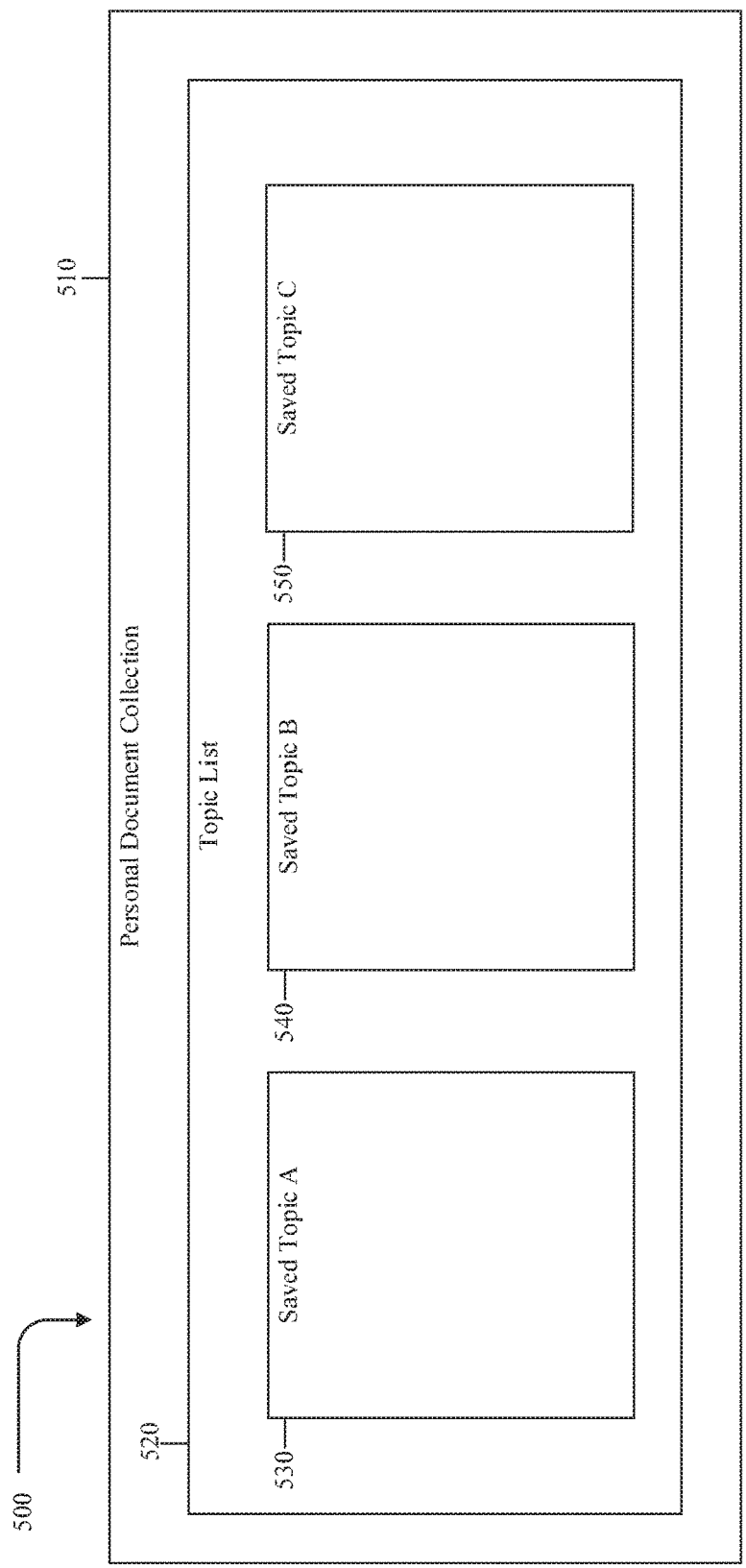
FIG. 5 is an embodiment of another data model employed by a DCP system deployed on a host device or on an NE configured as a server within a data center.

FIG. 5 is an embodiment of another data model 500 employed by a DCP system, such as DCP system 300, deployed on a host device, such as host device 195, or on an NE, such as NE 200, configured as a server, such as servers 110, 115, and 119, within a data center, such as data center 180. Data model 500 comprises Personal Document Collection data object 510. In an embodiment, Personal Document Collection data object 510 is employed by the DCP system to display topics within a Personal Document Collection associated with a user or a user profile. Personal Document Collection data object 510 comprises Topic List 520. Topic List 520 is a data object comprising Saved. Topics data objects A 530, B 540, and C 550. Each Topic Data Objects may comprise topic content for a corresponding topic. The information retrieved for each topic content may be a global or master system version of content (master topic content) for the corresponding topic (e.g., Topic 424) or a markup version of the master topic content (e.g., Topic 1 with Markup 430 and Topic 4 with Markup 436). In an embodiment, the master topic content is retrieved from the CMS when no marked up version associated with the user or user profile exists (e.g., Topic 424). In various embodiments, the DCP system builds a Personal Document Collection data object, such as Personal Document Collection data object 510, when the DCP system displays a Personal Document Collection associated with a user or user profile or when the DCP system exports the Personal Document Collection associated with a user profile to a format supported by a document browser, such as HEDEx.

Figure 6:
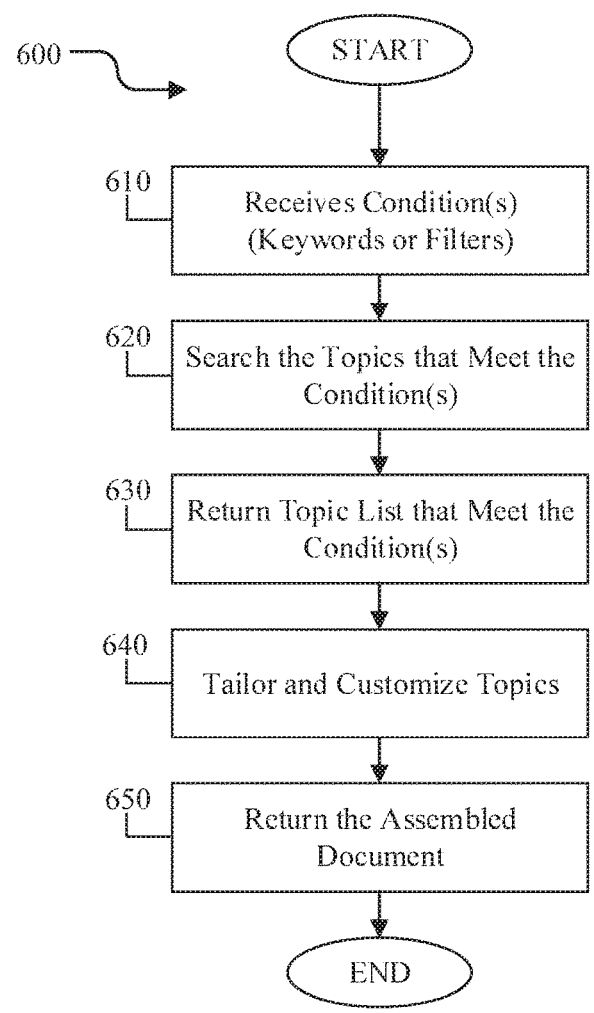
FIG. 6 is a flowchart of an embodiment of a method implemented in a DCP system deployed on a host device or on an NE configured as a server within a data center to customize documents and/or topics for a Personal Document Collection based on a set of received conditions.

FIG. 6 is a flowchart of an embodiment of a method 600 implemented in a DCP system, such as DCP system 300, deployed on a host device, such as host 195, or on an NE, such as NE 200, configured as a server, such as servers 110, 115, and 119, within a data center, such as data center 180, to customize documents and/or topics for a Personal Document Collection based on a set of received conditions. Method 600 may be implemented when the DCP system receives a condition(s) (e.g., from a user) to retrieve a set of topics with for a specified user profile. At step 610, a DCP component, such as DCP component 310, within the DCP system receives a set of conditions comprising keywords and/or filters for a specified user profile. At step 620, the DCP component searches for topics within a CMS that meet the received condition(s) in a CMS component, such as CMS component 330, with the system. At step 630, the CMS component returns a topic list comprising topics that meet the received conditions. At step 640, the DCP component tailors and customizes the returned topics based on the received condition(s). For example, the DCP component may create a navigation structure corresponding to a provided document browser that may be employed to display a Personal Document Collection data object, such as Personal Document Collection data object 510. The navigation structure may comprise a links for the various topics within the Personal Document Collection and/or a table of contents for the various topics corresponding to the provided document browser. As another example, the DCP component may create a framework that provides a mechanism to provide customization to the various topics included within a Personal Document Collection data object, such as Personal Document Collection data object 510. At step 650, the DCP component returns the assembled Personal Document Collection data object, such as Personal Document Collection data object 510.

Figure 7:
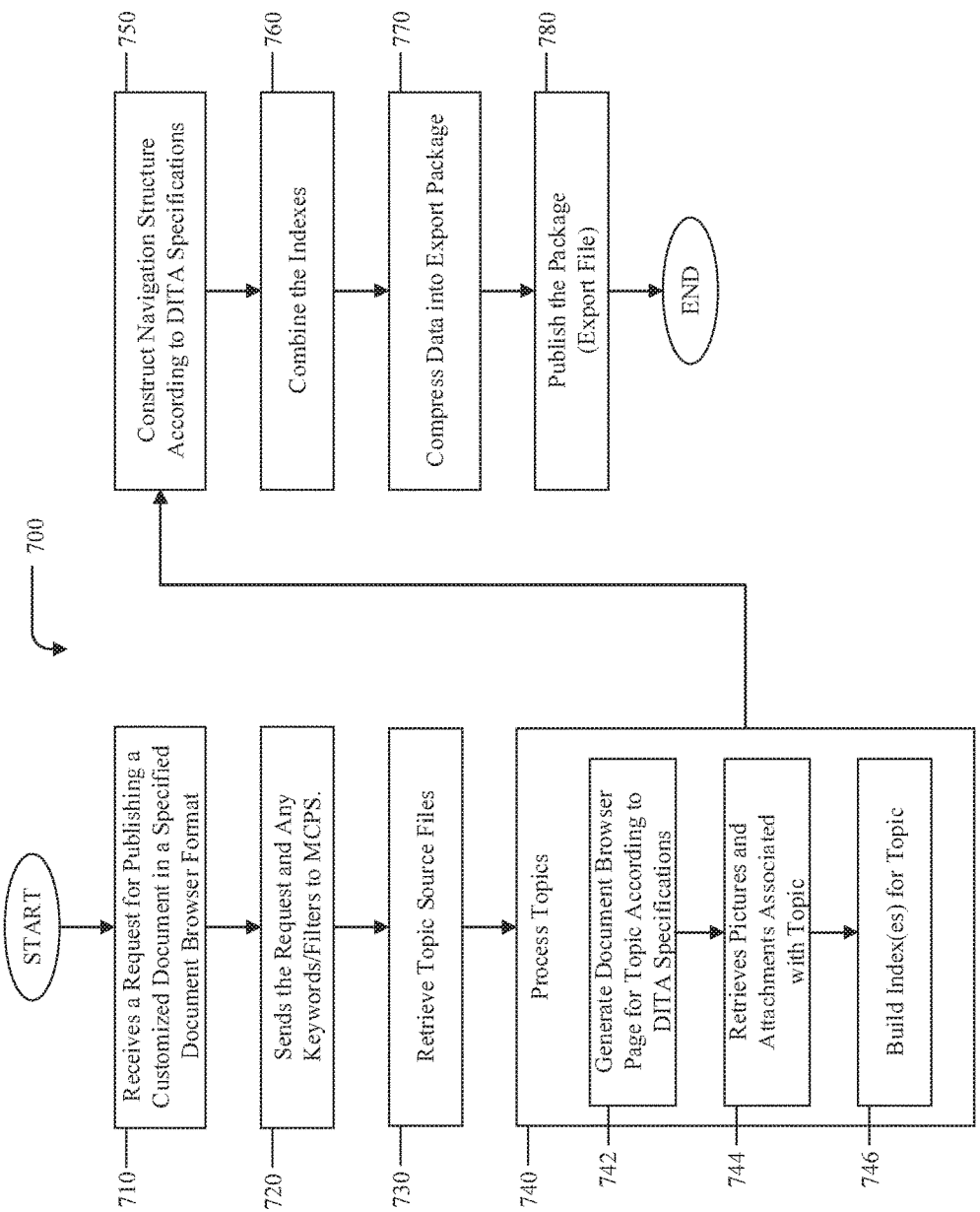
FIG. 7 is a flowchart of an embodiment of a method implemented in a. DCP system deployed on an NE configured as a server within a data center to publish customized documents and/or topics saved for a Personal Document Collection as an import file for a specified document browser.

FIG. 7 is a flowchart of an embodiment of a method 700 implemented in a DCP system, such as DCP system 300, deployed on an NE, such as NE 200, configured as a server, such as servers 110, 115, and 119, within a data center, such as data center 180, to publish customized documents and/or topics saved for a Personal Document Collection as an import file for a specified document browser. In an alternate embodiment, method 700 may be implemented in a DCP system, such as DCP system 300, deployed on a host device, such as host 195, in communication with a server, such as servers 110, 115, and 119, within a data center, such as data center 180, through a BR, such as BR 170. Method 700 may be implemented when the DCP system receives a request (e.g., from a user) to publish customized documents and/or topics saved for a Personal Document Collection to a file for importing into a specified document browser, such as a HEDEx.

At step 710, a DCP component, such as DCP component 310, within the DCP system receives a request for publishing a Personal Document Collection in a specified document browser format. At step 720, the DCP component sends the request and any received keywords or filters to narrow the topic list within a saved Personal Document Collection to an MCPS component, such as MCPS component 320, within the DCP system. In an embodiment, the topic source file list comprises all of the topics and/or documents saved for the Personal Document Collection. At step 730, the MCPS component retrieves the topic source files of each topic within the topic list or the topics within the topic list that match the provided keywords or filters from a CMS component, such as CMS component 330, within the DCP system. In an embodiment, the retrieved topic source files may be customized by a user that is authorized to save files to the Personal Document Collection. In an embodiment, when no customized topic source file is saved for a saved topic from the topic list, the system retrieves a globally saved source file for the topic. At step 740, the MCPS component processes each retrieved topic source. Steps 742, 744, and 746 are repeated for each retrieved topic source file. At step 742, the MCPS component generates a browser page corresponding to the specified document browser. In an embodiment, the MCPS component generates the page according to the current or a specified DITA specification. At step 744, the MCPS component retrieves any pictures and/or attachments associated with the topic source file. At step 746, the MCPS component builds an index(es) for the topic source file. At step 750, the MCPS component, constructs a navigation structure conforming to the requirements on the specified document browser based on the processed topics and the current or specified DITA specification. In an embodiment, the navigation structure comprises a list of topics and/or a table of contents. At step 760, the MCPS component combines the indexes created for each topic in step 746. In an embodiment, the combined indexes are employed to create a table of contents for each topic page or grouping(s) of pages. In an embodiment, step 760 is optional if the number of topics is limited to a small number (e.g., five or less) or if the topics contain few indexes (e.g., five or less). At step 770 the MCPS component, compresses the created data comprising the browser page constructed from the topic source file, the associated pictures and attachments, the navigation, and the indexes into an import file/package for the specified document browser. At step 780, the DCP component, publishes the import file package for the specified document browser and the process ends. In an embodiment, publishing the import file may include saving the import file to a local hard drive. In another embodiment, the DCP component may publish the import file by transmitting the import file to a host device(s). In yet other embodiment, the DCP component may publish the import file by preparing an HTTP download URL for the import package and transmit the published URL to a host device, such as host device 195.

Figure 8:
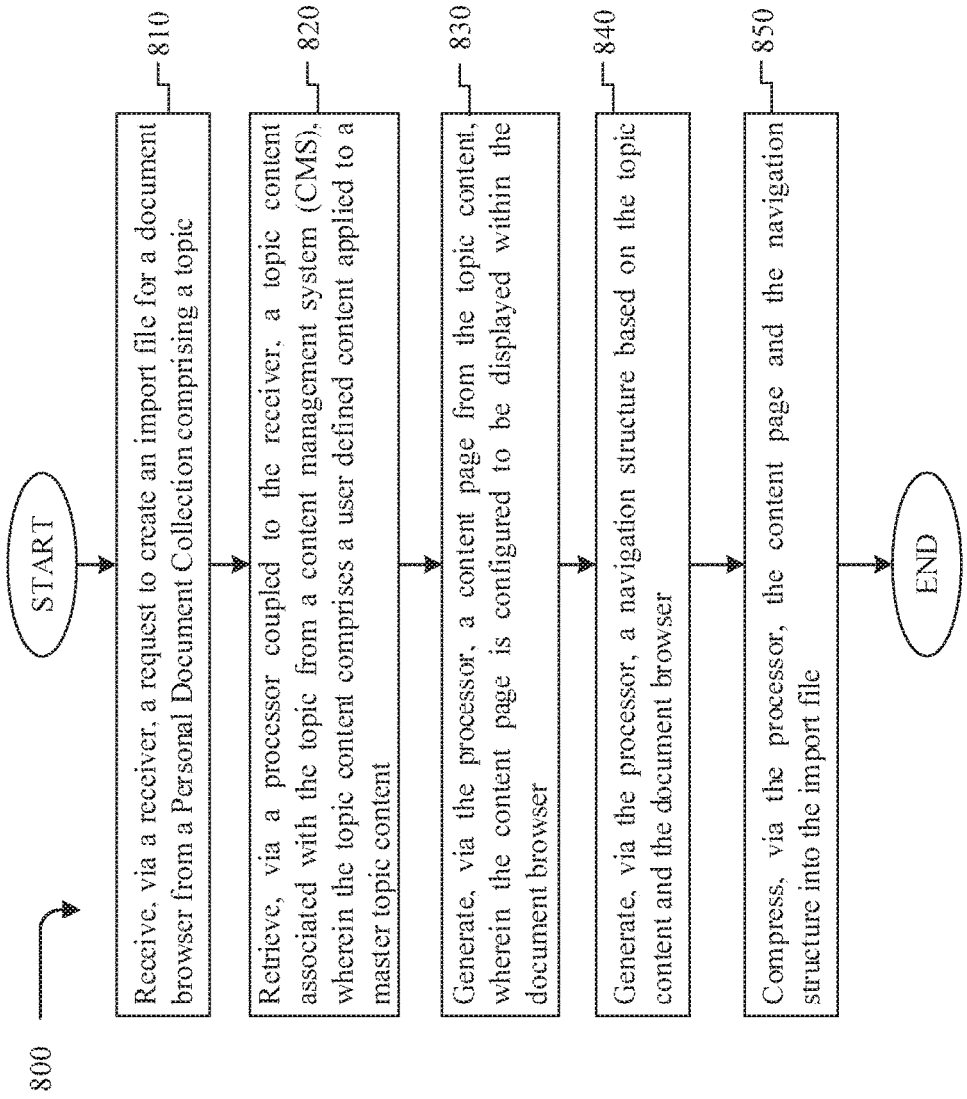
FIG. 8 is a flowchart of an exemplary embodiment of a method implemented in a DCP system deployed on a host device or on an NE configured as a server within a data center to export a Personal Document Collection to a import file for a specified document browser.

FIG. 8 is a flowchart of an exemplary embodiment of a method 800 implemented in a DCP system, such as DCP system 300, deployed on a host device, such as host 195, or on an NE, such as NE 200, configured as a server, such as servers 110, 115, and 119, within a data center, such as data center 180, to export a Personal Document Collection to an import file for a specified document browser. Method 800 is implemented at step 810 when the DCP system receives, via a receiver, a request to create an import file for a document browser from a Personal Document Collection comprising a topic. At step 820, the DCP system retrieves, via a processor coupled to the receiver, a topic content associated with the topic from a CMS, wherein the topic content comprises a user defined content applied to a master topic content. At step 830, the DCP system generates, via the processor, a content page from the topic content, wherein the content page is configured to be displayed within the document browser. At step 840, the DCP system generates, via the processor, a navigation structure based on the topic content and the document browser. At step 850, the DCP system compresses, via the processor, the content page and the navigation structure into the import file.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
a receiver configured to receive, from a host device physically separate from the NE, a request to create an import file for a specified document browser from a Personal Document Collection comprising a topic;
a processor coupled to the receiver and configured to:
retrieve a topic content associated with the topic from a content management system (CMS), wherein the topic content comprises a user defined content applied to a master topic content for the topic;

generate a content page from the topic content, wherein the content page is configured to be displayed within the specified document browser;

generate a navigation structure based on the topic content and the specified document browser; and compress the content page and the navigation structure into the import file;

a display coupled to the processor, the display configured to publish the import file by displaying the import file on the display; and a transmitter coupled to the processor and configured to transmit a location of the import file to the host device.

2. The NE of claim 1, wherein the processor is further configured to retrieve an attachment associated with the topic from the CMS, wherein the content page is further generated from the attachment.

3. The NE of claim 1, wherein the content page is generated according to a Darwin Information Typing Architecture (DITA) specification.

4. The NE of claim 1, wherein publishing the import file comprises generating a Hypertext Transfer Protocol (HTTP) download Uniform Resource Locator (URL) as the location of the import file.

5. The NE of claim 1, wherein the processor is further configured to:

build indexes based on the topic content;

construct a table of contents from the indexes; and compress the table of contents into the import file.

6. The NE of claim 1, wherein the specified document browser is HUAWEI Electronic Documentation Explorer (HEDEx).

7. The NE of claim 1, wherein the NE and the CMS are configured to operate within a data center.

8. The NE of claim 1, wherein the Personal Document Collection is associated with a user account and provides a mechanism to customize a pre-existing set of documents by an application of filters and metadata while keeping an original hierarchy of the set of documents.

9. The NE of claim 1, wherein the processor is further configured to retrieve the master topic content as the topic content when no user defined content for the topic associated with the Personal Document Collection is saved to the CMS.

10. The NE of claim 1, wherein the topic is assigned to a document through an inclusion in a Darwin Information Typing Architecture (DITA) map saved to the CMS.

11. A network device comprising:

a receiver configured to:

receive a list of topics associated with a Personal Document Collection assigned to a user account;

receive, from a host device physically separate from the NE, a request to create an import file for a document browser based on the Personal Document Collection;

a processor coupled to the receiver and configured to:

store the list of topics to a content management system (CMS);

retrieve topic content for each topic in the list of topics from the CMS;

generate a content page for each topic in the list of topics based on the retrieved topic content, wherein the content page is configured to be displayed within the document browser;

generate a navigation structure based on indexes generated from the retrieved topic content and the document browser; and compress the generated content pages and the navigation structure into the import file;

a local memory coupled to the processor and configured to store the import file; and a display coupled to the processor, the display configured to publish the import file by displaying the import file on the display.

12. The network device of claim 11, wherein the receiver is further configured to receive user content associated with a topic, and wherein the processor is further configured to:

store the user content to the CMS; and retrieve the user content as the topic content when the user content is stored in the CMS.

13. The network device of claim 11, wherein the request includes a filter or a keyword, and wherein the processor is further configured to:

retrieve the topic content for only the topics in the list of topics that match the filter or the keyword; and generate the content page for only the topics in the list of topics that match the filter or the keyword.

14. The network device of claim 11, wherein the CMS is configured to operate in a data center and is accessed remotely by the network device through a network.

15. The network device of claim 11, wherein a number of topics from the list of topics is assigned to a document via a Darwin Information Typing Architecture (DITA) map.

16. The network device of claim 11, wherein the content page is generated according to a Darwin Information Typing Architecture (DITA) specification.

17. A method implemented by a network clement (NE), comprising:

receiving, via a receiver, a request to create an import file for a document browser from a Personal Document Collection comprising a topic, the request received from a host device physically separate from the NE;

retrieving, via a processor coupled to the receiver, a topic content associated with the topic from a content management system (CMS), wherein the topic content comprises a user defined content applied to a master topic content;

generating, via the processor, a content page from the topic content, wherein the content page is configured to be displayed within the document browser;

generating, via the processor, a navigation structure based on the topic content and the document browser;

compressing, via the processor, the content page and the navigation structure into the import file; and publishing, via a display of the NE, the import file by displaying the import file on the display.

18. The method of claim 17 further comprising storing, via the processor, the import file to a memory location.

19. The method of claim 17, wherein the method further comprises:

generating, via the processor, a Hypertext Transfer Protocol (HTTP) download Uniform Resource Locator (URL) as a location of the import file; and transmitting, via a transmitter coupled to the processor, the location to the host device.

20. The method of claim 17 further comprising retrieving, via the processor, an attachment associated with the topic from the CMS, wherein the content page is further generated from the attachment.

* * * * *